United States Patent [19]
Hulbert

[11] Patent Number: 5,594,755
[45] Date of Patent: Jan. 14, 1997

[54] APPARATUS FOR USE IN EQUIPMENT PROVIDING A DIGITAL RADIO LINK BETWEEN A FIXED RADIO UNIT AND A MOBILE RADIO UNIT

[75] Inventor: Anthony P. Hulbert, Shirley, England

[73] Assignee: Roke Manor Research Limited, Hampshire, England

[21] Appl. No.: 292,040

[22] Filed: Aug. 18, 1994

[30] Foreign Application Priority Data

Aug. 26, 1993 [GB] United Kingdom .................. 9317781

[51] Int. Cl.$^6$ ............................ H04B 15/00; H04L 27/22
[52] U.S. Cl. ........................... 375/208; 375/324; 329/316
[58] Field of Search ..................................... 375/208, 324, 375/326, 340; 329/304, 316; 455/33.1; 379/59

[56] References Cited

U.S. PATENT DOCUMENTS 5,361,276 11/1994 Subramanian ........................ 375/200

FOREIGN PATENT DOCUMENTS

WO93/09622  5/1993  WIPO.

Primary Examiner—Stephen Chin
Assistant Examiner—T. Ghebretinsae
Attorney, Agent, or Firm—Hill, Steadman & Simpson

[57] ABSTRACT

Apparatus for use in equipment providing digital radio link between a fixed radio unit and a mobile radio unit. The apparatus includes demodulators arranged to receive inphase and quadrature phase input signals. A channel estimator is provided for deriving a decision directed channel estimate from one or more signals which is used by the demodulator for demodulating one or more of the signals transmitted over the same radio channel. The apparatus is for use in the demodulation of dual binary phase shift keying signals and various embodiments are possible. In addition, the apparatus may be used in conjunction with precombining Rake architecture.

15 Claims, 6 Drawing Sheets

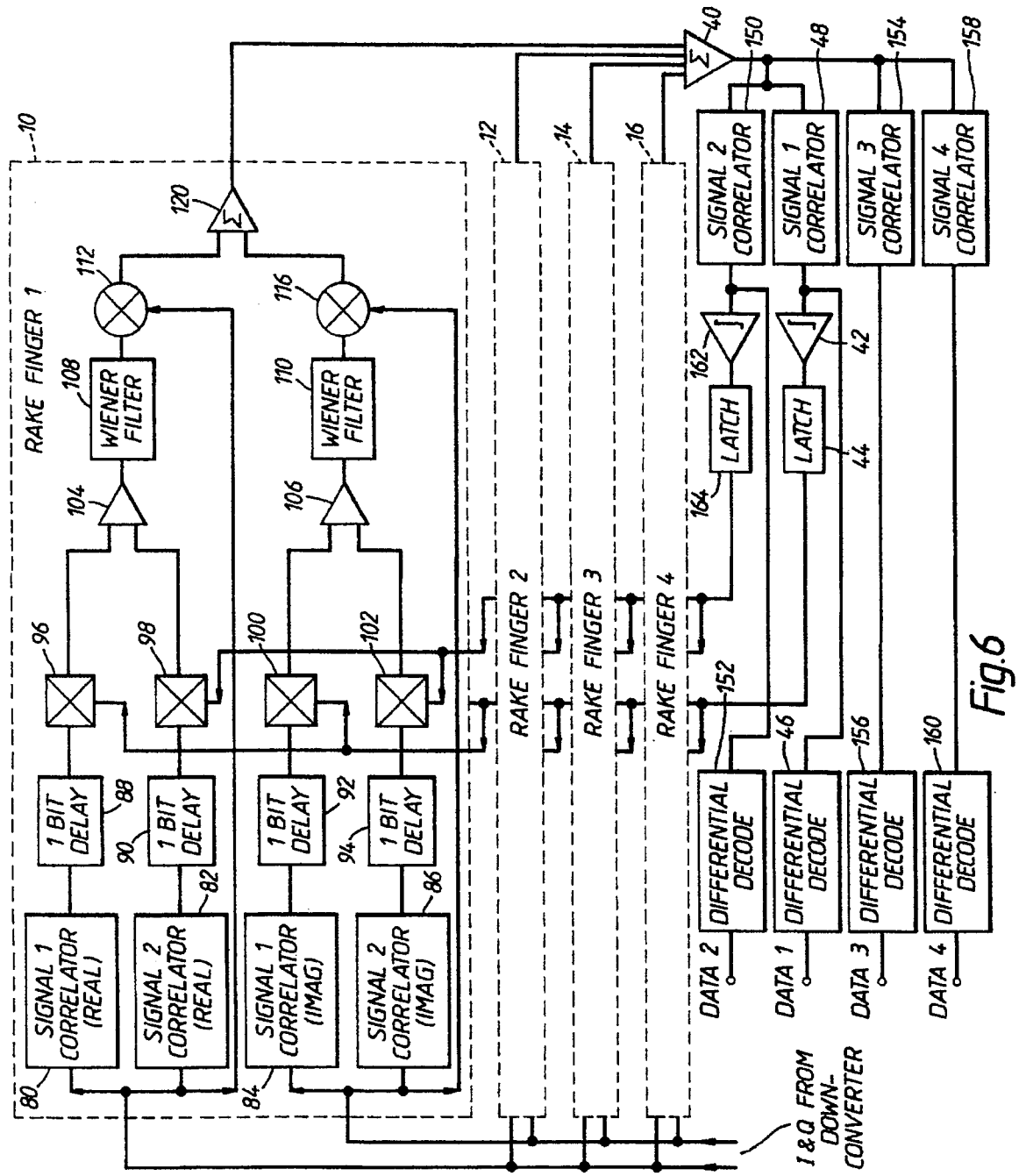

APPARATUS FOR USE IN EQUIPMENT PROVIDING A DIGITAL RADIO LINK BETWEEN A FIXED RADIO UNIT AND A MOBILE RADIO UNIT

BACKGROUND OF THE INVENTION

1. Field of the Invention

The present invention relates generally to radio links and more specifically to an apparatus for use in equipment providing a digital radio link between a fixed radio unit and a mobile radio unit.

2. Description of the Related Art

Equipment for providing such a radio link is described in Great Britain patent application No. 9304901.3. This application describes the use of Wiener-like filters for providing good estimates of the amplitudes of the inphase I and quadrature phase Q components of, for example, a spread spectrum pilot signal.

When demodulating DBPSK (Dual Binary Phase Shift Keying) with no pilot reference it is still possible to obtain and exploit a carrier reference by means of decision directed carrier extraction. Samples are fed into the Wiener filter and are modified according to the data decisions in order to provide a reference. Such a demodulator for performing this function is shown in FIG. 1, in which a plurality of Rake fingers are shown 10, 12, 14, 16. Each Rake finger has a signal correlator 18 which handles an inphase signal from a down-converter, and a further signal correlator 20 which handles a quadrature phase signal from a down-converter. The output signal from the correlator 18 is applied to a half linear multiplier 22 by way of a one bit delay circuit 26. The output of the half linear multiplier 22 is applied to an input of a Wiener-like filter 30. The output of the Wiener-like filter 30 is applied to a multiplier 34. The output of the correlator 18 is also applied to a further input of the multiplier 34, the output of which is applied to a first input of an adder circuit 38.

The output signal from the signal correlator 20 is applied to a half linear multiplier 24 by way of a one bit delay circuit 28. The output of the half linear multiplier 24 is applied to an input of a further Wiener-like filter 32. The output of the Wiener-like filter 32 is applied to an input of a multiplier 36. The output signal from the correlator 52 is also applied to a further input of the multiplier 36, the output of which is applied to a second input of the adder circuit 38. The output of the adder circuit 38 together with the output signals from the other Rake fingers 12, 14, 16 are applied to an adder circuit 40 which generates a combined sum of the input signals for application to a decision circuit 42. The decision circuit 42 merely identifies whether the signal is high or low and the output of the decision circuit 42 is fed back by way of a latch circuit 44 to a second input of the respective half linear multipliers 22, 24 in the Rake finger 10 and similarly to the half linear multipliers in the other Rake fingers 12, 14, 16. This is done to modify the signal applied to the respective Wiener filters 30, 32 in Rake finger 10 and similarly in the other Rake fingers. The output of the decision circuit 42 to applied to an input of a differential decode circuit 46 which is arranged to generate output data on an output line thereof.

The circuit shown in FIG. 1 uses hard decisions which are obtained using the sum over all the Rake fingers to remove the modulation from the received signal. The most up-to-date available decision is the previous one, so in order to remove the modulation this must be applied to the previous sample. This leads to a one sample delay. The delayed sample can be compensated by the previous decision. However, this must be used to provide a channel estimate for demodulation of the next sample. Thus, a one step predictor filter must be used. Inevitably this will mean that the performance will be inferior to systems incorporating a pilot reference which can apply symmetrical filtering.

SUMMARY OF THE INVENTION

It is an object of the present invention to provide a demodulator which does not make use of a pilot reference and in which a decision directed channel estimate can be derived from one or more signals and used to demodulate one or more signals transmitted over the same radio channel.

The present invention provides an apparatus for use in equipment providing a digital radio link between a fixed and a mobile radio unit. The apparatus has demodulation means arranged to receive inphase and quadrature phase input signals, estimation means for deriving a decision directed channel estimate from one or more signals which is used by the demodulation means for demodulating one or more signals transmitted over the same radio channel.

Various embodiments of the present invention will now be described with reference to the accompanying drawings.

BRIEF DESCRIPTION OF THE DRAWINGS

FIG. 6 shows a borrowed reference demodulator of the present invention using recombining Rake architecture with shared pilot generation.

DETAILED DESCRIPTION OF THE PREFERRED EMBODIMENTS

Figure 2:
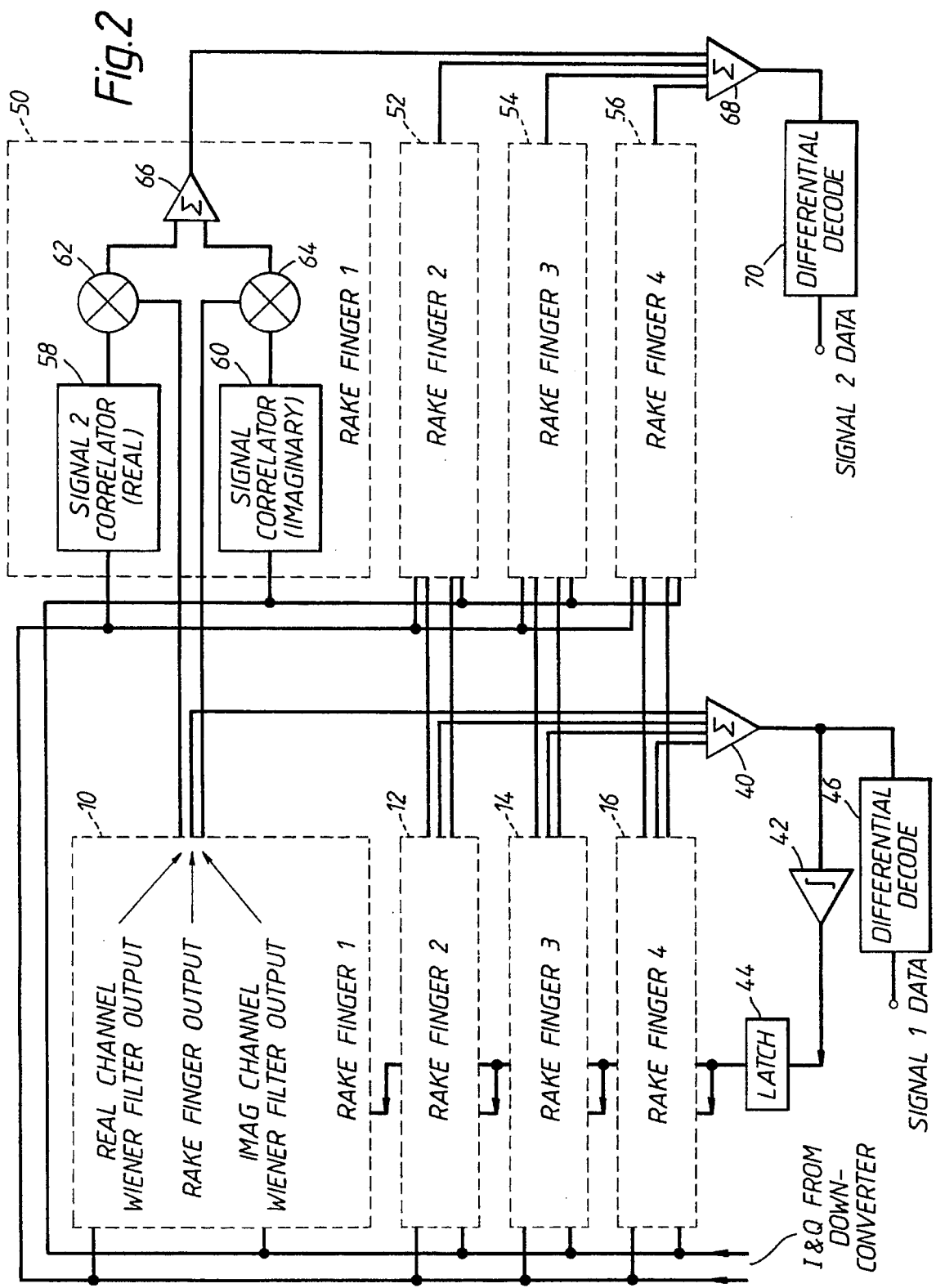
FIG. 2 shows a block diagram of a borrowed reference demodulator of the present invention.

Referring to FIG. 2, a block diagram of a borrowed reference demodulator using the DBPSK is shown and is useful where a small number of spread spectrum signals are transmitted over a common radio channel. If one of them is stronger than the others, then a borrowed reference demodulation technique may be applied.

Figure 1:
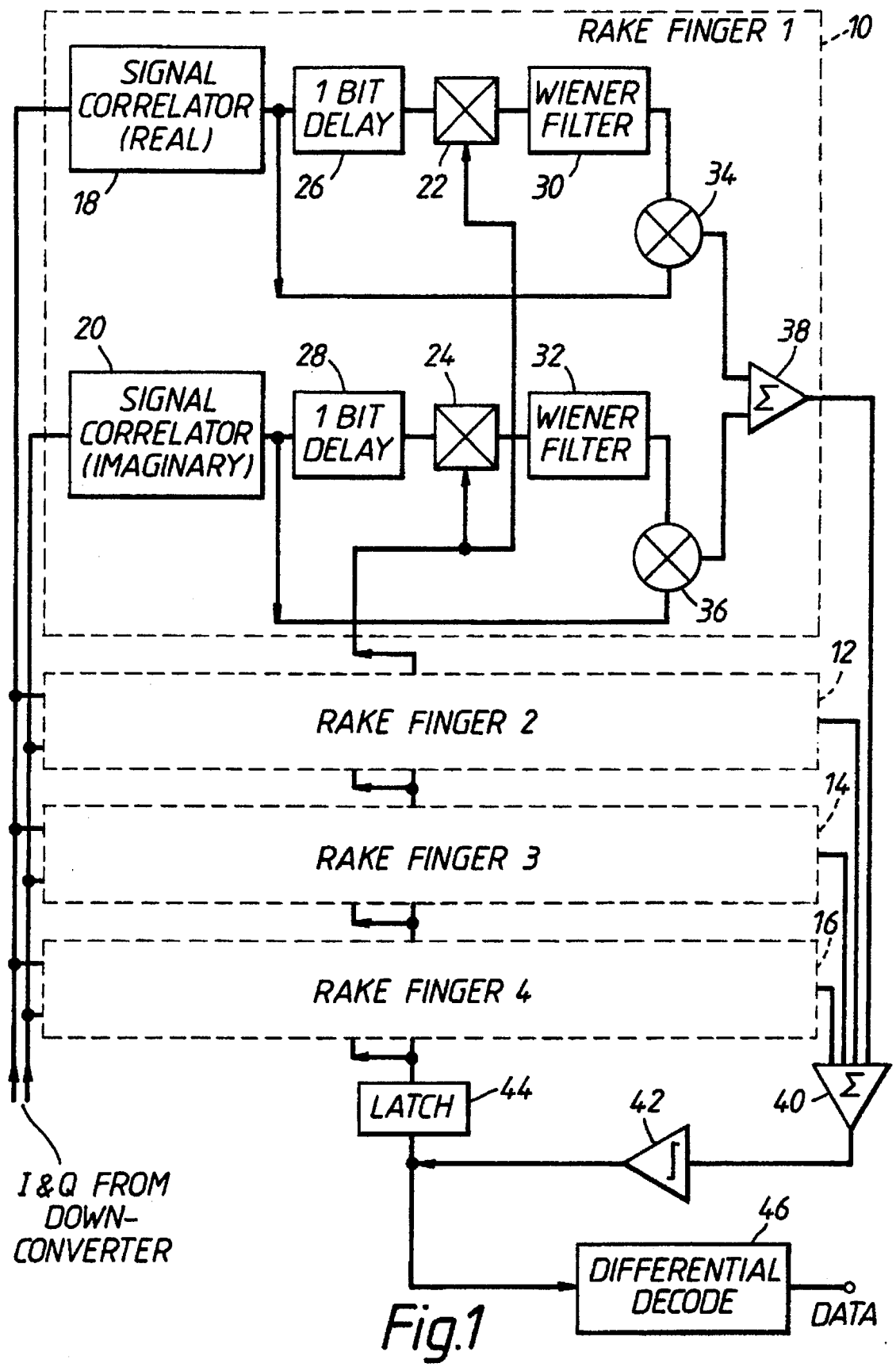
FIG. 1 shows a block diagram of a known prior art form of a demodulator.

In FIG. 2, the demodulation of two signals is considered although it will be appreciated by those skilled in the art that the architecture may be readily extended to more signals. Referring specifically to FIG. 2, the architecture shown on the left side of the diagram is almost identical to that of FIG. 1. Therefore, similar components have the same reference numeral as shown in FIG. 1. The only difference is that the Wiener filter outputs are tapped to provide channel estimates for the receiver shown on the right side of FIG. 2. The circuitry for demodulation of the second signal is therefore simpler, requiring neither Wiener filters nor decision directed removal of data. Moreover, if the mean power of signal 1 is greater than that of signal 2, as would be the case if the bit rate of the two signals were different, then the channel estimate provided from signal 1 will be more accurate than could have been provided from signal 2. It will be readily appreciated that additional receivers, each with the same architecture as the receiver for signal 2, could be added for demodulation of further spread spectrum signals.

The additional receiver comprises a number of Rake fingers 50, 52, 54, 56. Each Rake finger includes a signal correlator 58 for handling inphase components of the signal, and a further correlator 60 for handling the quadrature phase components of the signals. The respective inphase and quadrature phase signals are received from a down converter. An output from the signal correlator 58 is applied to a first input of a multiplier 62, and at a second input thereof the output from the Wiener filter in the real, inphase channel is applied. An output from the correlator 60 is applied to a first input of a multiplier 64 and at a second input thereof there is received the output from the Wiener filter in the imaginary, quadrature phase channel. The outputs from the multiplier 62, 64 are applied to a respective input of an adder circuit 66, the output of which is applied to a further adder circuit 68. The adder circuit 68 receives the outputs from the other Rake fingers 52, 54, 56, and its output is connected to an input of a further differential decode circuit 70 from which is generated the data indicative of the second signal.

The architecture as shown in FIG. 2 is based on the assumption that the first signal was stronger than all of the others. If this is not the case then significant benefits can be obtained by deriving a single, common channel reference from the combination of the two, or more, signals. A block diagram for two equal amplitude, equal rate, signals is shown in FIG. 3.

Figure 3:
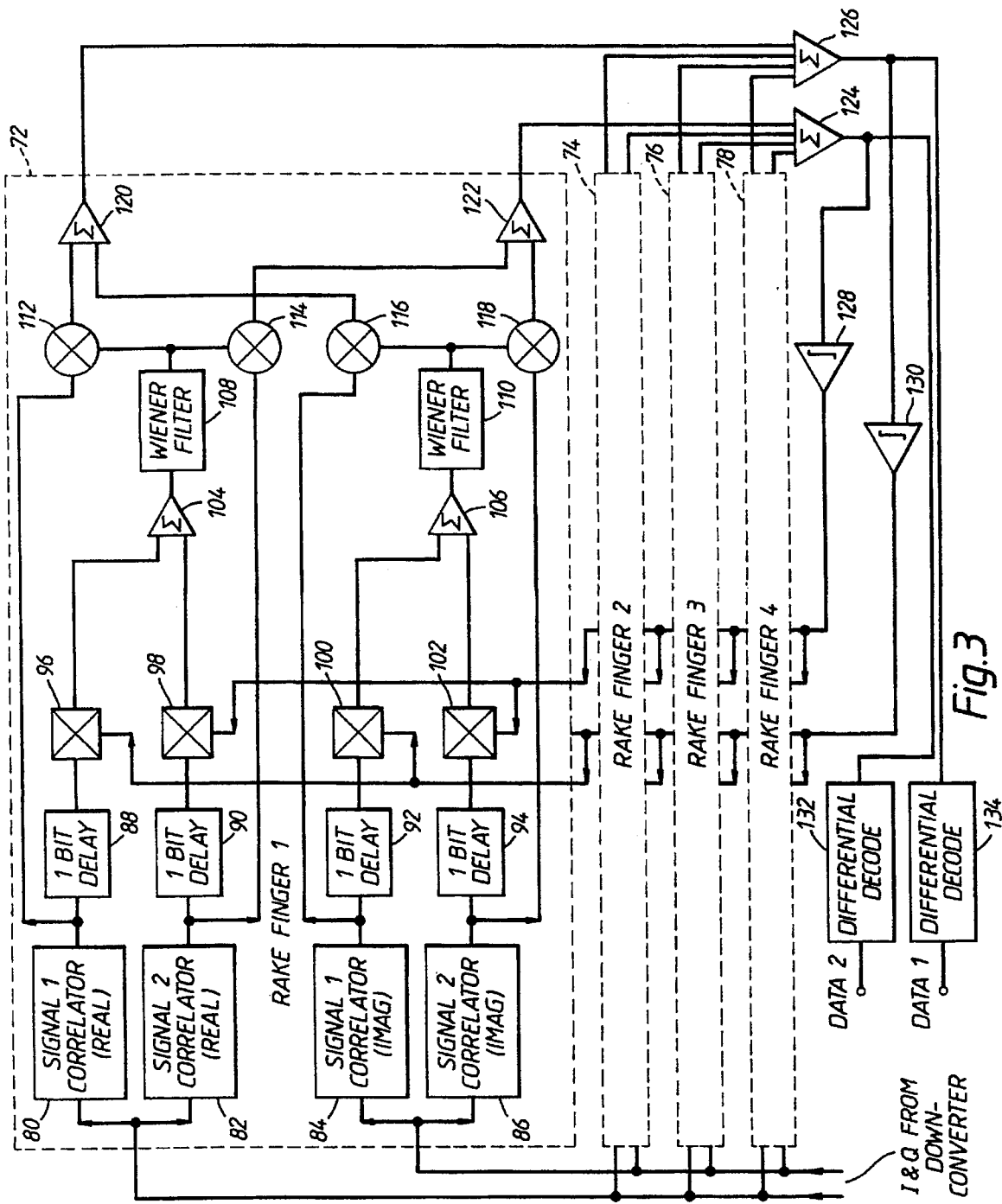
FIG. 3 shows a block diagram of a shared reference demodulator of the present invention.

Referring to FIG. 3, a plurality of Rake fingers 72, 74, 76, 78 are shown. Each of which has first and second signal correlators 80, 82 for handling the inphase signal components received from a down converter and third and fourth correlators 84, 86 for handling the quadrature phase components of an input signal similarly received from a down converter. An output from the signal correlates 80 is connected to an input of a one bit delay circuit 88 and to a first input of a multiplier 112. An output from the one bit delay circuit 88 is connected to an input of a half linear multiplier 96, the output of which is connected to an adder circuit 104. The output of the correlator 82 is connected to an input of a one bit delay circuit 90 and to a first input of a multiplier 114. The output from the one bit delay circuit 90 is connected to a first input of a half linear multiplier 98. The output of which is connected to a further input of the adder circuit 104. The output of the adder circuit 104 is connected to an input of a Wiener filter 108, the output of which is connected to a second input of the multipliers 112, 114. The signal correlates 84 has an output connected to a one bit delay circuit 92 and to a first input of a multiplier 116. An output from the one bit delay circuit 92 is connected to a first input of a half linear multiplier 100, the output of which is connected to an input of an adder circuit 106. The output of the adder circuit 106 is connected to an input of a Wiener filter 110, the output of which is connected to second inputs of the multipliers 116 and 118. The signal correlates 86 has an output connected to an input of a one bit delay circuit 94 and to a first input of the multiplier 118. An output from the one bit delay circuit 94 is connected to an input of a half linear multiplier 102, the output of which is connected to a further input of the adder circuit 106. An output from the multipliers 112, 116 are connected to a respective input of an adder circuit 120, and the outputs from the multipliers 114, 118 are connected to a respective input of an adder circuit 122.

The circuitry described so far is repeated in each of the Rake fingers. The output from the adder circuit 120 and the respective outputs from the other Rake fingers are applied to an adder circuit 126 and the outputs from the adder circuit 122 and the other adder circuits in the Rake fingers are applied to an input of an adder circuit 124. The output from the adder circuit 126 is connected to a hard limiting device 130, the output of which is fed back to a second input of the half linear multipliers 96, 100 in each Rake finger. Similarly the output of the adder circuit 124 is applied to a hard limiting circuit 128, the output of which is fed back to the half linear multipliers 98, 102 in each Rake finger. The outputs of the adder circuits 124, 126 are also applied to a respective differential decode circuit 132, 134 respectively from which the output data is generated for each signal.

In the architecture shown in FIG. 3, the two signals are de-spread independently, decision corrected independently and added together to feed to the input of the channel estimation filter, that is the Wiener filters 108, 110. For demodulation of equal rate signals received over the same paths this results in an approximate 3 dB reduction in the mean square error for the channel estimates.

It will be appreciated that receivers for more than two signals could be combined. It will also be appreciated that the architectures of FIGS. 2 and 3 could readily be combined so that pilot estimation could be achieved over any equal bit rates but applied to m>n signals where the additional signals for demodulation all had a significantly lower bit rate.

If more than two equal bit rate signals are combined then a greater improvement in the channel reference will occur. The demodulator described with reference to FIG. 3 is most usefully applied to the case of equal bit rate signals but is not restricted to this case.

Figure 4:
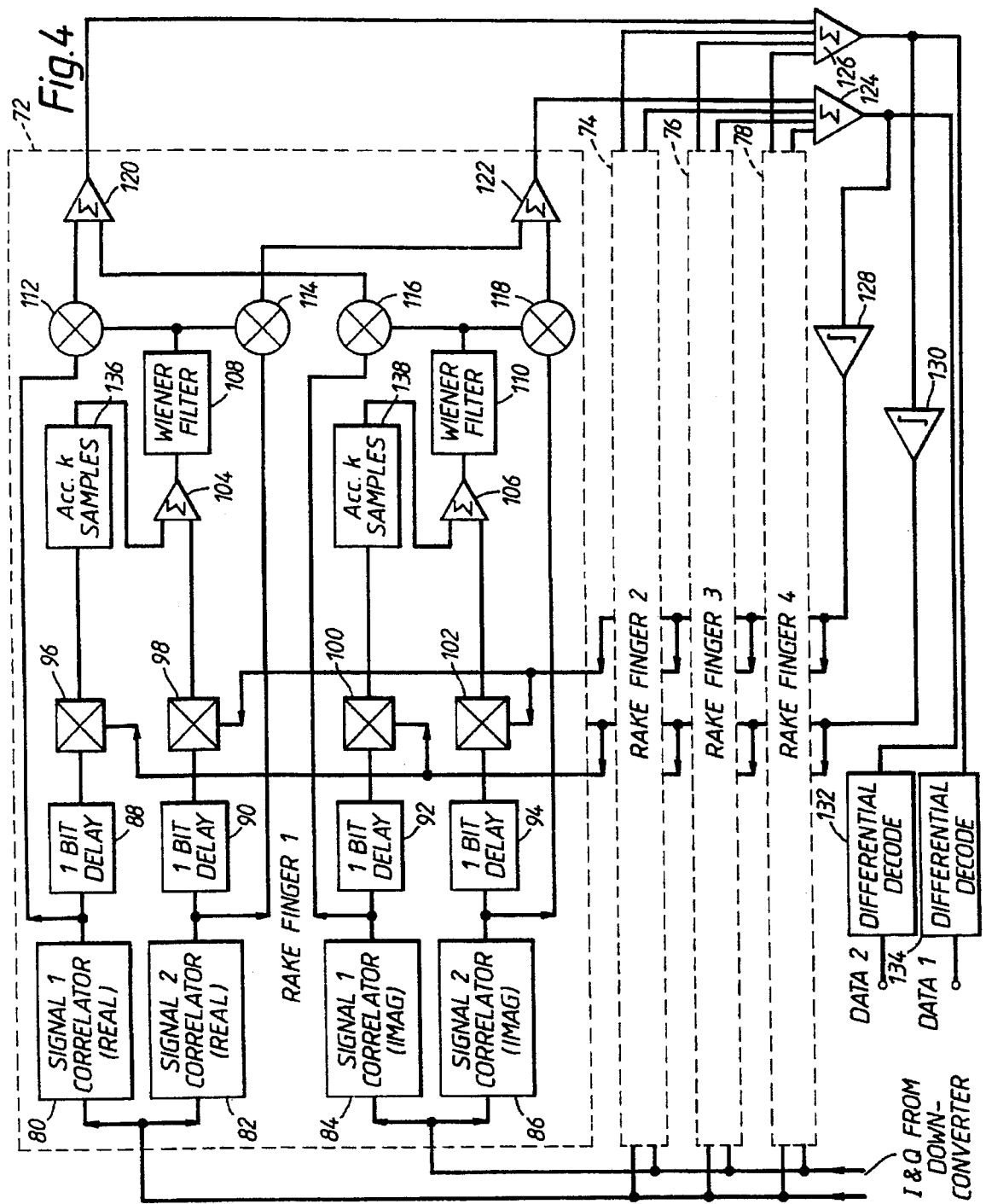
FIG. 4 shows a block diagram of a shared reference demodulator of the present invention operating at difference bit rates.

Consider the case of two signals, signal 1 operating at bit k×B kbps and signal 2 operating a B kbps. To accommodate these different bit rates FIG. 3 can conveniently be modified as shown in FIG. 4. Therefore, like circuit elements have been given the same designation. The difference between FIGS. 3 and 4 is the inclusion of the sample blocks 136 and 138 between the output of the half linear multiplier 96 and the input of the adder 104, and the output of the half linear multiplier 100 and the input of the adder circuit 106, respectively. These blocks add together samples of the higher bit rate signalling in blocks of k samples prior to input to the Wiener filter 108, 110 respectively. In this way, the rates of inputs to the adders 104, 106 respectively are matched. Moreover, the accumulation effectively weights the high bit rate signal (stronger signal) in proportional to its amplitude in such a way that the optimum benefit is obtained from combination across the signals. For two signals a bit rate ratio, k, of about 2 is probably the largest figure for which shared reference generation is worth while. This leads to a reduction in mean square error for the pilot reference of about 1.8 dB.

Figure 5:
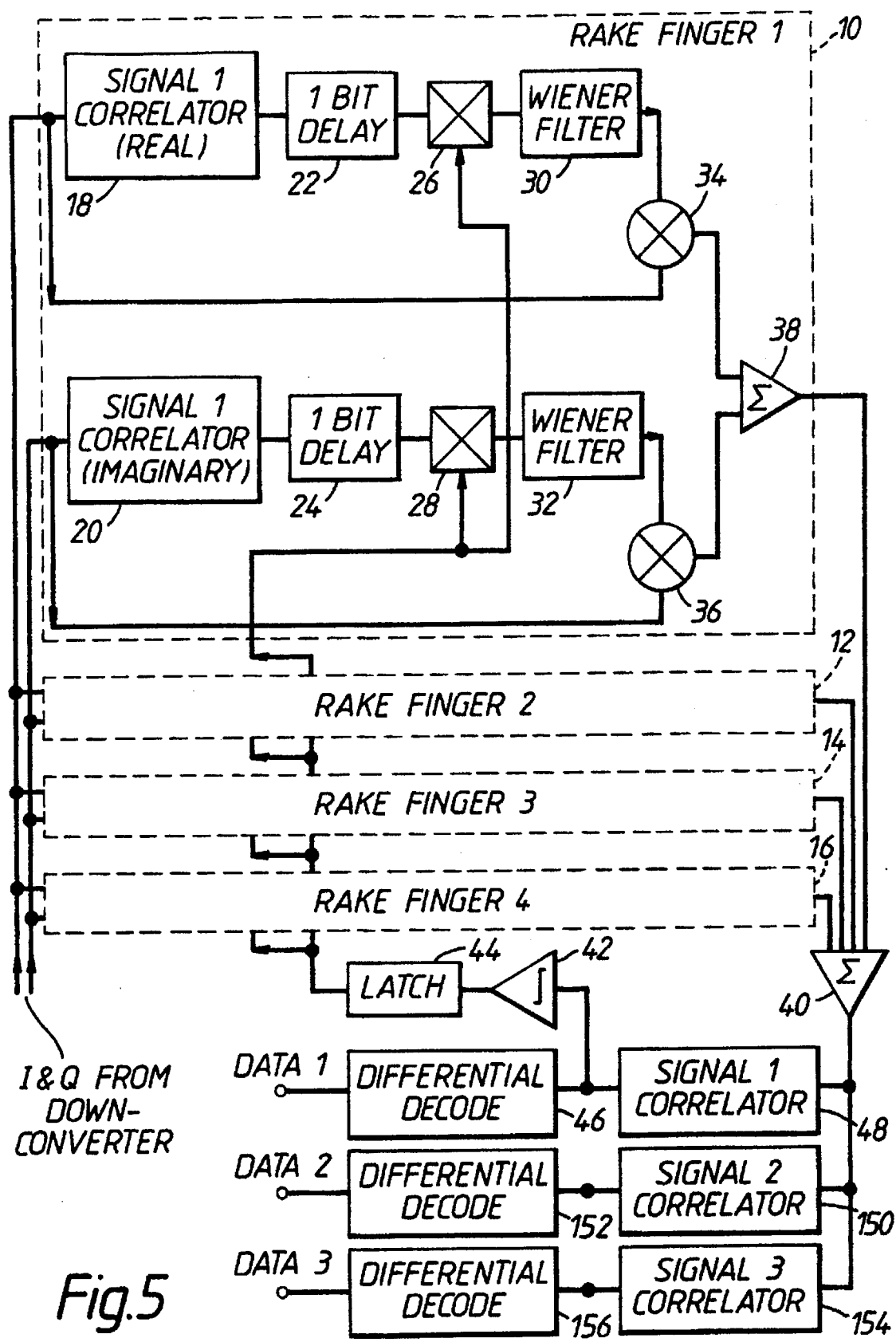
FIG. 5 shows a block diagram of a borrowed reference demodulator of the present invention using precombining Rake architecture.

Any of the above embodiments may be implemented using a pre-combining Rake architecture, and may be used for decision directed reference extraction and for the demodulation of multiple signals. The architecture which achieves this is shown in FIG. 5. FIG. 5 is similar to FIG. 1 and like circuit elements have been given the same reference numeral.

In FIG. 5 the output from the adder circuit 40 is connected to a respective input of the signal correlators 48, 150, 154 which handles the signals 1, 2 and 3 respectively. An output from each correlator is respectively fed to an input of a differential decode circuit 46, 152, 156 from which the data output is taken from a respective output line. The inputs for the half linear multipliers 26, 28 are taken from the output of the correlator 48 and is similarly fed via a hard limiting circuit 42 and a latch circuit 44. The outputs from each Rake finger are therefore at the chip rate rather than the bit rate. Thus, an additional correlator is required in order to demodulate signal 1 following the overall combiner. The benefit of such an architecture is that now, additional signals can be readily demodulated with just the addition of a further real correlator and a differential decoder for each additional signal as shown. The correlator 150 and the differential decode circuit 152 handles signal 2 and the correlator 154 and the differential decode circuit 156 handles the signal 3.

Clearly the functionality of FIG. 5 could be combined with that of FIG. 3 or 4 to enable the precombining to be performed on the basis of more than one signal while allowing multiplicity of additional lower bit rate signals to be demodulated. The architecture for the case of combining FIG. 5 with FIG. 3 is illustrated in FIG. 6 and like circuit elements have been given the same reference numeral.

The difference between the Rake fingers of FIG. 3 and FIG. 6 is that the output of the Wiener filters 108, 110 are applied to a first input of a multiplier 112, 116 respectively. The second input of the multipliers 112, 116 receive the inphase and quadrature phase components of the input signal from the down converter, respectively. The outputs from the Rake fingers are summed by the adder circuit 40. The output of which is applied to an input of a plurality of signal correlators 48, 150, 154 and 158 handling signals 1–4, respectively. The output of the signal correlators 154 and 158 are applied to an input of a differential decode circuit 156, 160 respectively from which the data signals 3 and 4 are generated. The output signals from the signal correlators 48 and 150 are applied to a hard limiting device 42, 162 respectively and to the differential decode circuits 46, 152 respectively from which the data signals 1 and 2 are generated. The output signals from the hard limiting devices 42, 162 are applied to a respective latch circuit 44, 164. The output of the latch circuit 44 is applied to the second input of the half linear multipliers 96 and 100 in each Rake finger, and similarly the output of the latch circuit 164 is applied to the second input of the half linear multipliers 98, 102 in each Rake finger.

The signals 1 and 2 are both transmitted at the same bit rate which is higher than the rate of signals 3 and 4. Thus the channel estimates are formed on the basis of decision directed demodulation of signals 1 and 2 and are then used for the purpose of rate precombining. The precombined signal can then be readily de-spread for demodulating of additional signals such as signals 3 and 4.

Although the invention has been described with respect to preferred embodiments, it is not to be so limited as changes and modifications can be made therein which are within the full intended scope as defined by the appended claims.

I claim:

1. Apparatus for use in equipment providing a digital radio link between a fixed radio unit and a mobile radio unit, said apparatus comprising:

demodulating means for receiving a plurality of inphase and quadrature phase data input signals; and estimation means for deriving a decision directed channel estimate from at least one of said plurality of data signals for demodulating at least a first and a second data signal of said plurality of data signals transmitted over a radio channel using said demodulating means.

2. Apparatus as claimed in claim 1, wherein said demodulating means comprises:

a plurality of demodulators for handling a plurality of spread spectrum signals transmitted over a common radio channel, a first demodulator having a plurality of Rake fingers each Rake finger including correlation means for an inphase channel and a quadrature phase channel;

first multiplying means for combining an output from said correlation means with a feedback signal and for providing a signal for application to Wiener-like filter means;

second multiplying means for combining an output from said Wiener-like filter means with an output from said correlation means to produce an output signal; and first adder means for summing said output signal from said second multiplying means;

each further demodulator having a plurality of Rake fingers, each Rake finger including first and second correlation means for receiving inphase and quadrature phase input signals respectively;

first multiplying means for combining an output from said first correlation means with an output from said Wiener-like filter means associated with said inphase channel;

second multiplying means for combining an output from said second correlation means with an output from said Wiener-like filter means associated with said quadrature phase channel; and second adder means for summing an output from said first and second multiplying mean in each Rake finger of each further demodultor;

and, third adder means for summing an output from each adder means in each Rake finger of each further demodulator to provide an output for application to decoding means for generating data relating to said second signal.

3. Apparatus as claimed in claim 2, wherein said estimation means comprises fourth adder means for summing output signals from each Rake finger of said first demodulator, and limiting means connected to an output from said fourth adder means which generates an output signal which is fed back to said first multiplying means in each Rake finger of said first demodulator, said limiting means also connected to decoding means to generate data relating to said first signal.

4. Apparatus as claimed in claim 1, wherein a single common channel reference is derived from a combination of two or more signals, said apparatus comprising:

a plurality of Rake fingers each including circuit means for handling an inphase and quadrature phase input signal respectively, each circuit means having first and second correlation means connected to a first and second multiplying means respectively which receives a feedback signal at a further input thereof, and an output from said first and second multiplying means being applied to first adder means having an output connected to Wiener-like filter means having an output connected to third and fourth multiplying means and combined with an output from said first and second correlator respectively, an output from each third multiplying means is connected to second adder means, and an output from said fourth multiplying means is connected to third adder means, an output from said second adder means in each Rake finger is connected to fourth adder means, an output of which is fed back to said first multiplying means by way of a limiting device and to decoding means for generating said first data signal, and an output from said third adder means in each Rake finger is connected to fifth adder means, an output of which is fed back to said second multiplying means by way of a limiting device and to decoding means for generating said second data signal.

5. Apparatus as claimed in claim 4, wherein said output of said first multiplying means is connected to said first adder means by way of accumulation means arranged to add together samples of a higher bit rate signal in blocks of a plurality of samples.

6. Apparatus as claimed in claim 1, further comprising:
a plurality of Rake fingers wherein each Rake finger comprises first and second correlation means for handling an inphase and quadrature phase input signal respectively, an output from each correlation means being connected to an input of first multiplying means arranged to receive a feedback signal at a further input thereof, an output from said first multiplying means being connected to an input of Wiener-like filter means, an output of which is connected to an input of second multiplying means, which receives the inphase and quadrature phase signal respectively at a further input thereof, adder means for summing an output of said second multiplying means; further adder means for summing an output from said adder means from each Rake finger, an output of which is connected to at least a third, fourth and fifth correlation means each having an output connected to decoding means to generate output data signals respectively, an output from said third correlation means being fed back to a further input of said first multiplying means by way of a limiting device.

7. Apparatus as claimed in claim 6, wherein each Rake finger comprises a further first and second correlation means and a further first multiplying means for handling the inphase signal and quadrature phase signal respectively, an output from said first and said further first multiplying means being connected to adder means having an output connected to said Wiener-like filter means, said further first multiplying means receiving a feedback signal generated from said fourth correlation means by way of a limiting device.

8. Apparatus as claimed in claim 7, wherein the output of said first multiplying means is connected to said adder means by way of an accumulation means arranged to add together samples of a higher bit rate signal in blocks of a plurality of samples.

9. Apparatus for use in equipment providing a digital radio link between a fixed radio unit and a mobile radio unit, said apparatus comprising:
demodulating means for receiving a plurality of inphase and quadrature phase data input signals including:
a plurality of demodulators for handling a plurality of spread spectrum signals transmitted over a common radio channel, a first demodulator having a plurality of Rake fingers each Rake finger including correlation means for an inphase channel and a quadrature phase channel;
first multiplying means for combining an output from said correlation means with a feedback signal and for providing a signal for application to Wiener-like filter means;
second multiplying means for combining an output from said Wiener-like filter means with an output from said correlation means to produce an output signal;
first adder means for summing said output signal from said second multiplying means;

each further demodulator having a plurality of Rake fingers, each Rake finger including first and second correlation means for receiving inphase and quadrature phase input signals respectively;
first multiplying means for combining an output from said first correlation means with an output from said Wiener-like filter means associated with said inphase channel;
second multiplying means for combining an output from said second correlation means with an output from said Wiener-like filter means associated with said quadrature phase channel; and
second adder means for summing an output from said first and second multiplying means in each Rake finger of each further demodulator;
third adder means for summing an output from each adder means in each Rake finger of each further demodulator to provide an output for application to decoding means for generating data relating to said second signal; and
estimation means for deriving a decision directed channel estimate from at least one of said plurality of data signals for demodulating at least a first and a second data signal of said plurality of data signals transmitted over a radio channel using said demodulating means.

10. Apparatus as claimed in claim 9, wherein said estimation means comprises fourth adder means for summing output signals from each Rake finger of said first demodulator, and limiting means connected to an output from said fourth adder means which generates an output signal which is fed back to said first multiplying means in each Rake finger of said first demodulator, said limiting means also connected to decoding means to generate data relating to said first signal.

11. Apparatus for use in equipment providing a digital radio link between a fixed radio unit and a mobile radio unit, wherein a single common channel reference is derived from a combination of two or more signals, said apparatus comprising:
demodulating means for receiving a plurality of inphase and quadrature phase data input signals;
estimation means for deriving a decision directed channel estimate from at least one of said plurality of data signals for demodulating at least a first and a second data signal of said plurality of data signals transmitted over a radio channel using said demodulating means; and
a plurality of Rake fingers each including circuit means for handling an inphase and quadrature phase input signal respectively, each circuit means having first and second correlation means connected to a first and second multiplying means respectively which receives a feed back signal at a further input thereof, and an output from said first and second multiplying means being applied to first adder means having an output connected to Wiener-like filter means having an output connected to third and fourth multiplying means and combined with an output from said first and second correlator respectively, an output from each third multiplying means is connected to second adder means, and an output from said fourth multiplying means is connected to third adder means, an output from said second adder means in each Rake finger is connected to fourth adder means, an output of which is fed back to said first multiplying means by way of a limiting device and to decoding means for generating said first data signal, and an output from said third adder means in each Råke finger is connected to fifth adder means, an output of which is fed back to said second multiplying means by way of a limiting device and to decoding means for generating said second data signal.

12. Apparatus as claimed in claim 11, wherein said output of said first multiplying means is connected to said first adder means by way of accumulation means arranged to add together samples of a higher bit rate signal in blocks of a plurality of samples.

13. Apparatus for use in equipment providing a digital radio link between a fixed radio unit and a mobile radio unit, said apparatus comprising:

demodulating means for receiving a plurality of inphase and quadrature phase data input signals;

estimation means for deriving a decision directed channel estimate from at least one of said plurality of data signals for demodulating at least a first and a second data signal of said plurality of data signals transmitted over a radio channel using said demodulating means; and a plurality of Rake fingers wherein each Rake finger comprises first and second correlation means for handling an inphase and quadrature phase input signal respectively, an output from each correlation means being connected to an input of first multiplying means arranged to receive a feedback signal at a further input thereof, an output from said first multiplying means being connected to an input of Wiener-like filter means, an output of which is connected to an input of second multiplying means, which receives the inphase and quadrature phase signal respectively at a further input thereof, adder means for summing an output of said second multiplying means; further adder means for summing an output from said adder means from each Rake finger, an output of which is connected to at least a third, fourth and fifth correlation means each having an output connected to decoding means to generate output data signals respectively, an output from said third correlation means being fed back to a further input of said first multiplying means by way of a limiting device.

14. Apparatus as claimed in claim 13, wherein each Rake finger comprises a further first and second correlation means and a further first multiplying means for handling the inphase signal and quadrature phase signal respectively, an output from said first and said further first multiplying means being connected to adder means having an output connected to said Wiener-like filter means, said further first multiplying means receiving a feedback signal generated from said fourth correlation means by way of a limiting device.

15. Apparatus as claimed in claim 14, wherein the output of said first multiplying means is connected to said adder means by way of an accumulation means arranged to add together samples of a higher bit rate signal in blocks of a plurality of samples.

* * * * *